(12) United States Patent
Summerfield et al.

(10) Patent No.: US 6,346,792 B1
(45) Date of Patent: Feb. 12, 2002

(54) BATTERY CHARGING AND MAINTENANCE SYSTEM

(76) Inventors: John Summerfield, 930 Bichara Blvd., Lady Lake, FL (US) 32159; Victor Wright, 244 Ainsworth Road, Bury, Lancashire BL8 2LR (GB)

(*) Notice: Subject to any disclaimer, the term of this patent is extended or adjusted under 35 U.S.C. 154(b) by 0 days.

(21) Appl. No.: 09/865,353

(22) Filed: May 25, 2001

(51) Int. Cl.[7] .................................................. H02J 7/00
(52) U.S. Cl. ........................................................ 320/109
(58) Field of Search ................................. 320/107–109

(56) References Cited

U.S. PATENT DOCUMENTS

| | | |
|---|---|---|
| 3,652,917 A | 3/1972 | Biggs ........................... 320/128 |
| 4,061,956 A | 12/1977 | Brown et al. ................ 320/153 |
| 4,426,612 A | 1/1984 | Wicnienski et al. ........ 320/146 |
| D278,047 S | 3/1985 | Puckett et al. .............. D13/107 |
| 4,849,682 A | 7/1989 | Bauer et al. ................. 320/106 |
| 5,218,286 A | 6/1993 | Vandunk ...................... 320/125 |
| D419,955 S | * 2/2000 | Silzer, Jr. .................... D13/108 |
| 6,114,833 A | * 9/2000 | Langston et al. ........... 320/107 |

* cited by examiner

Primary Examiner—Peter S. Wong
Assistant Examiner—Pia Tibbits

(57) ABSTRACT

A battery charging and maintenance system for providing long term maintenance and charging of batteries. The battery charging and maintenance system includes a charging assembly designed for converting alternating current into direct current for use in charging batteries, a golf cart regulator assembly electrically couplable to the charging assembly, a golf cart charging lead assembly for electrically coupling the charging assembly to the golf cart regulator assembly, an automobile regulator assembly electrically couplable to the charging assembly, and an automobile charging lead assembly for electrically coupling the charging assembly to the automobile regulator assembly.

16 Claims, 4 Drawing Sheets

BATTERY CHARGING AND MAINTENANCE SYSTEM

BACKGROUND OF THE INVENTION

1. Field of the Invention

The present invention relates to battery chargers and more particularly pertains to a new battery charging and maintenance system for providing long term maintenance and charging of batteries.

2. Description of the Prior Art

The use of battery chargers is known in the prior art. More specifically, battery chargers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,849,682; 4,426,612; 4,061,956; 5,218,286; 3,652,917; and U.S. Pat. No. Des. 278,047.

While these devices fulfill their respective, particular objectives and requirements, the aforementioned patents do not disclose a new battery charging and maintenance system. The inventive device includes a charging assembly designed for converting alternating current into direct current for use in charging batteries, a golf cart regulator assembly electrically couplable to the charging assembly, a golf cart charging lead assembly for electrically coupling the charging assembly to the golf cart regulator assembly, an automobile regulator assembly electrically couplable to the charging assembly, and an automobile charging lead assembly for electrically coupling the charging assembly to the automobile regulator assembly.

In these respects, the battery charging and maintenance system according to the present invention substantially departs from the conventional concepts and designs of the prior art, and in so doing provides an apparatus primarily developed for the purpose of providing long term maintenance and charging of batteries.

SUMMARY OF THE INVENTION

In view of the foregoing disadvantages inherent in the known types of battery chargers now present in the prior art, the present invention provides a new battery charging and maintenance system construction wherein the same can be utilized for providing long term maintenance and charging of batteries.

The general purpose of the present invention, which will be described subsequently in greater detail, is to provide a new battery charging and maintenance system apparatus and method which has many of the advantages of the battery chargers mentioned heretofore and many novel features that result in a new battery charging and maintenance system which is not anticipated, rendered obvious, suggested, or even implied by any of the prior art battery chargers, either alone or in any combination thereof.

To attain this, the present invention generally comprises a charging assembly designed for converting alternating current into direct current for use in charging batteries, a golf cart regulator assembly electrically couplable to the charging assembly, a golf cart charging lead assembly for electrically coupling the charging assembly to the golf cart regulator assembly, an automobile regulator assembly electrically couplable to the charging assembly, and an automobile charging lead assembly for electrically coupling the charging assembly to the automobile regulator assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new battery charging and maintenance system apparatus and method which has many of the advantages of the battery chargers mentioned heretofore and many novel features that result in a new battery charging and maintenance system which is not anticipated, rendered obvious, suggested, or even implied by any of the prior art battery chargers, either alone or in any combination thereof.

It is another object of the present invention to provide a new battery charging and maintenance system which may be easily and efficiently manufactured and marketed.

It is a further object of the present invention to provide a new battery charging and maintenance system which is of a durable and reliable construction.

An even further object of the present invention is to provide a new battery charging and maintenance system which is susceptible of a low cost of manufacture with regard to both materials and labor, and which accordingly is then susceptible of low prices of sale to the consuming public, thereby making such battery charging and maintenance system economically available to the buying public.

Still yet another object of the present invention is to provide a new battery charging and maintenance system which provides in the apparatuses and methods of the prior art some of the advantages thereof, while simultaneously overcoming some of the disadvantages normally associated therewith.

Still another object of the present invention is to provide a new battery charging and maintenance system for providing long term maintenance and charging of batteries.

Yet another object of the present invention is to provide a new battery charging and maintenance system which includes a charging assembly designed for converting alternating current into direct current for use in charging batteries, a golf cart regulator assembly electrically couplable to the charging assembly, a golf cart charging lead assembly for electrically coupling the charging assembly to the golf cart regulator assembly, an automobile regulator assembly electrically couplable to the charging assembly, and an automobile charging lead assembly for electrically coupling the charging assembly to the automobile regulator assembly.

Still yet another object of the present invention is to provide a new battery charging and maintenance system that can charge both an automobile battery and a golf cart battery simultaneously.

Even still another object of the present invention is to provide a new battery charging and maintenance system that prevents damage to golf cart batteries when connected long term.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
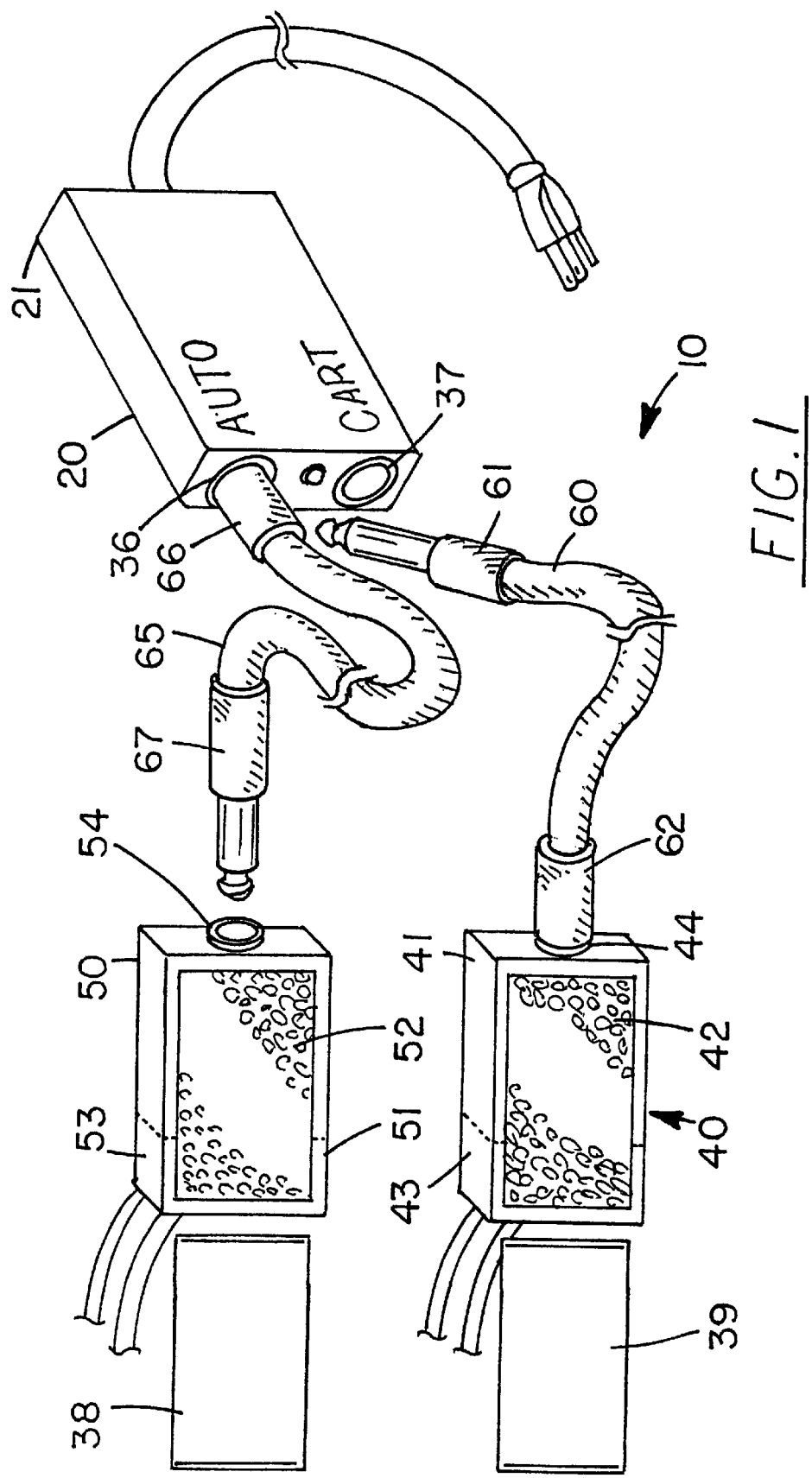
FIG. 1 is a schematic perspective view of a new battery charging and maintenance system according to the present invention.
Figure 2:
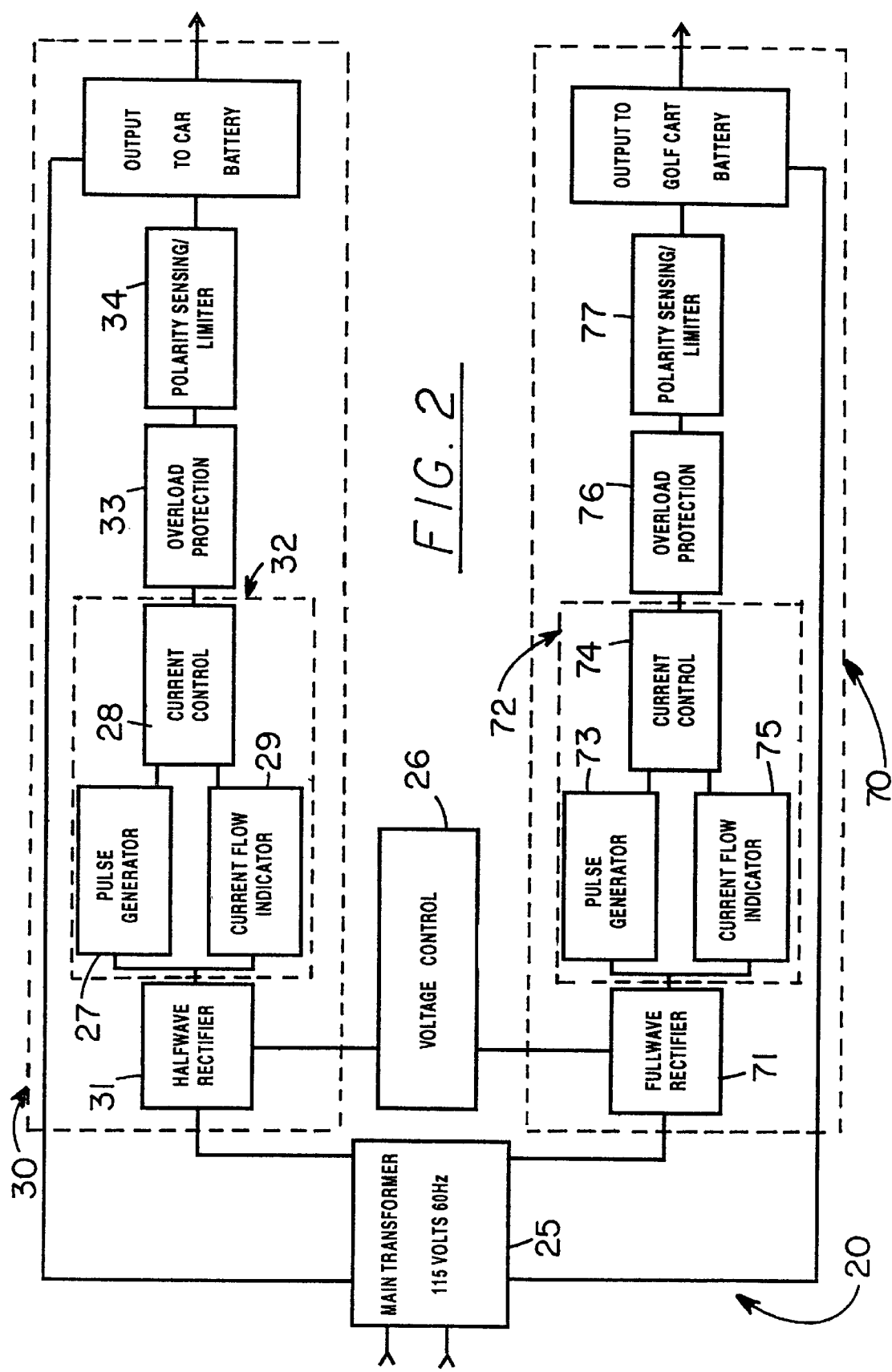
FIG. 2 is a schematic functional block diagram view of the charging assembly of the present invention.
Figure 3:
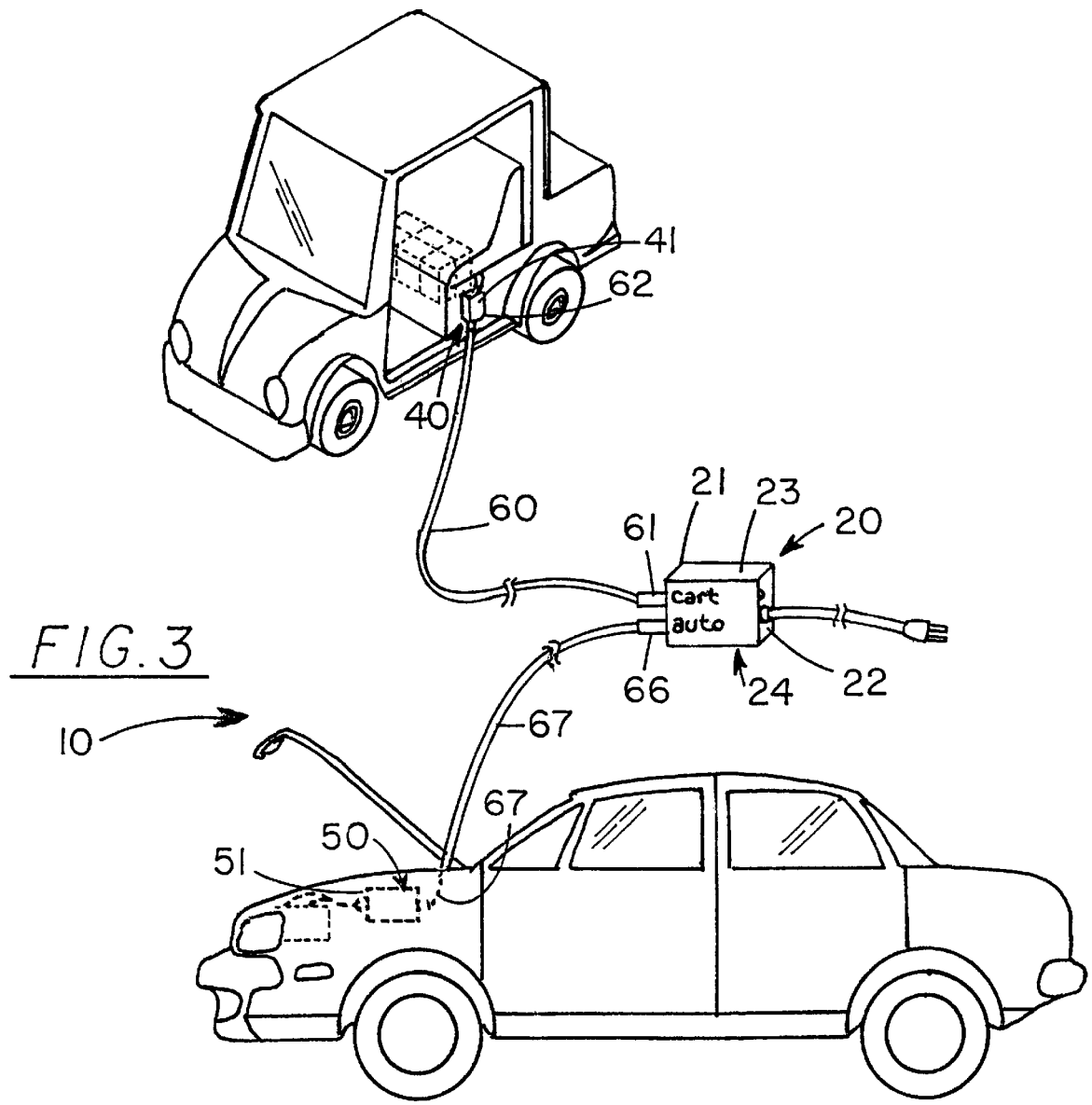
FIG. 3 is a schematic perspective view of the present invention in use.
Figure 4:
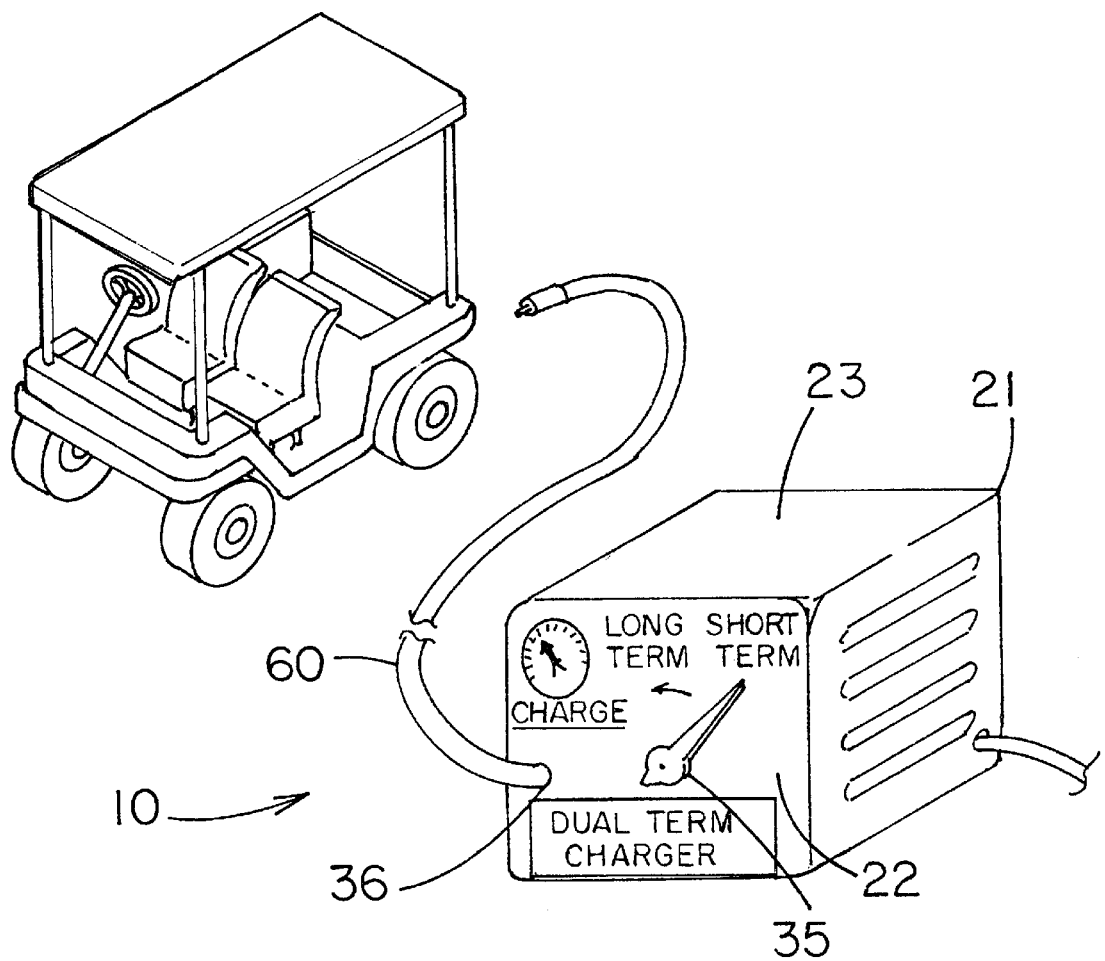
FIG. 4 is a schematic perspective view of an embodiment of the present invention.

With reference now to the drawings, and in particular to FIGS. 1 through 4 thereof, a new battery charging and maintenance system embodying the principles and concepts of the present invention and generally designated by the reference numeral 10 will be described.

As best illustrated in FIGS. 1 through 4, the battery charging and maintenance system 10 generally comprises a charging assembly 20, a golf cart regulator assembly 40, an automobile regulator assembly 50, a golf cart charging lead assembly 60, and an automobile charging lead assembly 65.

The charging assembly 20 is designed for converting alternating current into direct current for use in charging batteries.

The golf cart regulator assembly 40 includes an housing 41. The housing 41 includes a first portion of hook and loop fastener 42 applied to a back face of the housing 41. The first portion of hook and loop fastener 42 is used to couple the golf cart regulator 40 to an interior surface of the golf cart.

The golf cart regulator 40 is electrically couplable to the charging assembly 20.

The golf cart charging lead assembly 60 is used for electrically coupling the charging assembly 20 to the golf cart regulator assembly 40.

The automobile regulator assembly 50 includes an housing 51. The housing 51 includes a first portion of hook and loop fastener 52 applied to a back face of the housing 51. The first portion of hook and loop fastener 52 is used to couple the automobile regulator 50 to an interior surface of the automobile. The automobile regulator 50 is electrically couplable to the charging assembly 20.

The automobile charging lead assembly 65 is for electrically coupling the charging assembly 20 to the automobile regulator assembly 50.

The charging assembly 20 further comprises an housing 21, a transformer 25, a voltage control assembly 26, a first rectifier assembly 30, and a second rectifier assembly 70.

The housing 21 includes four side walls 22, a top wall 23 and a bottom wall 24, which define an interior space.

The transformer 25 is designed for stepping down voltage from an outlet. The transformer 25 preferably is designed for working with 115 volts and 60 hertz. The transformer 25 is positioned within the housing 21.

The voltage control assembly 26 is for controlling the voltage output of the charging assembly 20. The voltage control assembly 26 is positioned within the housing 21.

The first rectifier assembly 30 is for converting the stepped down ac voltage from the transformer 25 to a dc voltage for use in charging the battery of an automobile. The first rectifier assembly 30 is positioned within the housing 21.

The second rectifier assembly 70 is for converting the stepped down ac voltage from the transformer 25 to a dc voltage for use in charging the batteries of a golf cart. The second rectifier assembly 70 is positioned within the housing 21.

The first rectifier assembly 30 further comprises a half wave rectifier 31, a pulse generator assembly 32, an overload protection circuit 33, and a polarity sensing and limiting circuit 34.

The half wave rectifier 31 is used for converting an ac voltage from the transformer 25 to a dc voltage. The half wave rectifier 31 is operationally coupled to the voltage control assembly 26.

The pulse generator assembly 32 is electrically connected to an output of the half wave rectifier 31. The pulse generator 32 is used to pulse an output of the charging assembly 20.

The overload protection circuit 33 is electrically coupled in series with the pulse generator assembly 32. The overload protection circuit 33 prevents an output exceeding a predetermined level.

The polarity sensing and limiting circuit 34 is electrically connected in series with the overload protection circuit 33. The polarity sensing and limiting circuit 34 is designed for preventing the reverse biasing of the battery when connected to the battery charging and maintenance system 10.

The pulse generating 32 assembly further comprises a pulse generator 27, a current control circuit 28 and a current flow indicator 29.

The pulse generator 27 is used for pulsing an output of the half wave rectifier 31.

The current control circuit 28 is connected in series with the pulse generator 27 and provides a control feedback signal.

The current flow indicator 29 is connected to the control feedback signal of the current control circuit 28 and provides a current indicator signal to the pulse generator 27 such that a control loop is defined by the pulse generator 27, current control circuit 28 and current flow indicator 29.

The second rectifier assembly 70 further comprises a full wave rectifier 71, a second pulse generator assembly 72, a second overload protection circuit 76, and a second polarity sensing and limiting circuit 77.

The full wave rectifier 71 is for converting an ac voltage from the transformer 25 to a dc voltage. The full wave rectifier 71 is operationally coupled to the voltage control assembly 26.

The second pulse generator assembly 72 is electrically connected to an output of the full wave rectifier 71. The second pulse generator 72 is used to pulse an output of the charging assembly 20.

The second overload protection circuit 76 is electrically coupled in series with the second pulse generator assembly 72. The second overload protection circuit 76 prevents an output exceeding a predetermined level.

The second polarity sensing and limiting circuit 77 is electrically connected in series with the second overload protection circuit 76. The second polarity sensing and limiting circuit 77 is designed for preventing the reverse biasing of the battery when connected to the battery charging and maintenance system 10.

The second pulse generating assembly 72 further comprises a second pulse generator 73, a second current control circuit 74, and a second current flow indicator circuit 75.

The second pulse generator 73 is used for pulsing an output of full half wave rectifier 71.

The second current control circuit 74 is connected in series with the second pulse generator 73 and provides a control feedback signal.

The second current flow indicator 75 is connected to the control feedback signal of the second current control circuit 74 and provides a current indicator signal to the second pulse generator 73 such that a control loop is defined by the second pulse generator 73, second current control circuit 74 and second current flow indicator 75.

The automobile regulator assembly 50 further comprises a regulator 53 for maintaining the voltage output by the first rectifier assembly 30 within a predetermined maximum value and a predetermined minimum value.

The golf cart regulator assembly 40 further comprises a second regulator 43 for maintaining the voltage output by the second rectifier assembly 70 within a predetermined maximum value and a predetermined minimum value.

The charging unit 20 further comprises a first 36 and second output jack 37. The first output jack 36 is electrically coupled to the first rectifier assembly 30. The first output jack 36 is positioned such that the first output jack 36 is accessible through an opening in a side wall 22 of the housing 21. The second output jack 37 is electrically coupled to the second rectifier assembly 70. The second output jack 37 is positioned such that the second output jack 37 is accessible through an opening in a side wall 22 of the housing 21.

In an embodiment, the automobile regulator assembly 50 further comprises an input jack 54. The input jack 54 is positioned such that the input jack 54 is accessible through an aperture in the housing 51.

In a further embodiment, the golf cart regulator assembly 40 further comprises a second input jack 44. The second input jack 44 is positioned such that the second input jack 44 is accessible through and aperture in the housing 41.

In still a further embodiment the automobile charging lead assembly 65 further comprises a first plug member 66 and a second plug member 67. The first plug member 66 and the second plug member 67 prevent reverse biasing of the battery of the automobile when the automobile regulator assembly 50 is electrically coupled to the first rectifier assembly 30 using the automobile charging lead assembly 65.

In an embodiment the golf cart charging lead assembly 60 further comprises a third 61 and fourth plug member 62. The third plug member 61 and the fourth plug member 62 prevent reverse biasing of the batteries of the golf cart when the golf cart regulator assembly 40 is electrically coupled to the second rectifier assembly 70 using the golf cart charging lead assembly 60.

A first 38 and second piece of a second portion of hook and loop fastener 39 is designed for coupling to a surface of the automobile and golf cart respectively.

In an embodiment, the first rectifier assembly 30 includes the first regulator 53 and the second rectifier assembly 70 includes the second regulator 43. The first regulator 53 and the second regulator 43 are both connected to a switch member 35, which is used to select the desired signal and route the desired signal to a single output 36.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A battery charging and maintenance system for the long term maintenance and charging needs of golf carts comprising:

a charging assembly adapted for converting alternating current into direct current for use in charging batteries;

a golf cart regulator assembly having a housing, said housing having a first portion of hook and loop fastener applied to a back face of said housing, said first portion of hook and loop fastener is used to couple said golf cart regulator to an interior surface of the golf cart, said golf cart regulator is electrically couplable to said charging assembly;

a golf cart charging lead assembly for electrically coupling said charging assembly to said golf cart regulator assembly;

an automobile regulator assembly having a housing, said housing having a first portion of hook and loop fastener applied to a back face of said housing, said first portion of hook and loop fastener is used to couple said automobile regulator to an interior surface of the automobile, said automobile regulator is electrically couplable to said charging assembly; and an automobile charging lead assembly for electrically coupling said charging assembly to said automobile regulator assembly.

2. The battery charging and maintenance system of claim 1, wherein said charging assembly further comprises:

a housing having four side walls a top wall and a bottom wall defining an interior space;

a transformer adapted for stepping down voltage from an outlet, said transformer preferably is adapted for working with 115 volts and 60 hertz, said transformer is positioned within said housing;

a voltage control assembly for controlling the voltage output of the charging assembly, said voltage control assembly is positioned within said housing;

a first rectifier assembly for converting the stepped down ac voltage from said transformer to a dc voltage for use in charging the battery of an automobile, said first rectifier assembly is positioned within said housing;

a second rectifier assembly for converting the stepped down ac voltage from said transformer to a dc voltage for use in charging the batteries of a golf cart, said second rectifier assembly is positioned within said housing.

3. The battery charging and maintenance system of claim 2, wherein said first rectifier assembly further comprises:

a half wave rectifier for converting an ac voltage from said transformer to a dc voltage, said half wave rectifier is operationally coupled to said voltage control assembly;

a pulse generator assembly electrically connected to an output of said half wave rectifier, said pulse generator is used to pulse an output of said charging assembly;

an overload protection circuit electrically coupled in series with said pulse generator assembly, said overload protection circuit preventing an output exceeding a predetermined level; and a polarity sensing and limiting circuit electrically connected in series with said overload protection circuit, said polarity sensing and limiting circuit is adapted for preventing the reverse biasing of the battery when connected to said battery charging and maintenance system.

4. The battery charging and maintenance system of claim 3, wherein said pulse generating assembly further comprises:

a pulse generator for pulsing an output of said half wave rectifier;

a current control circuit connected in series with said pulse generator and providing a control feedback signal; and a current flow indicator connected to the control feedback signal of said current control circuit and providing a current indicator signal to said pulse generator such that a control loop is defined by said pulse generator, current control circuit and current flow indicator.

5. The battery charging and maintenance system of claim 2, wherein said second rectifier assembly further comprises:

a full wave rectifier for converting an ac voltage from said transformer to a dc voltage, said full wave rectifier is operationally coupled to said voltage control assembly;

a second pulse generator assembly electrically connected to an output of said full wave rectifier, said second pulse generator is used to pulse an output of said charging assembly;

a second overload protection circuit electrically coupled in series with said second pulse generator assembly, said second overload protection circuit preventing an output exceeding a predetermined level; and a second polarity sensing and limiting circuit electrically connected in series with said second overload protection circuit, said second polarity sensing and limiting circuit is adapted for preventing the reverse biasing of the battery when connected to said battery charging and maintenance system.

6. The battery charging and maintenance system of claim 5, wherein said second pulse generating assembly further comprises:

a second pulse generator for pulsing an output of full half wave rectifier;

a second current control circuit connected in series with said second pulse generator and providing a control feedback signal; and a second current flow indicator connected to the control feedback signal of said second current control circuit and providing a current indicator signal to said second pulse generator such that a control loop is defined by said second pulse generator, second current control circuit and second current flow indicator.

7. The battery charging and maintenance system of claim 2, wherein said automobile regulator assembly further comprises:

a regulator for maintaining the voltage output by said first rectifier assembly within a predetermined maximum value and a predetermined minimum value.

8. The battery charging and maintenance system of claim 2, wherein said golf cart regulator assembly further comprises:

a second regulator for maintaining the voltage output by said second rectifier assembly within a predetermined maximum value and a predetermined minimum value.

9. The battery charging and maintenance system of claim 2, wherein said charging unit further comprises:

a first output jack electrically coupled to said first rectifier assembly, said first output jack is positioned such that said first output jack is accessible through an opening in a side wall of said housing;

a second output jack electrically coupled to said second rectifier assembly, said second output jack is positioned such that said second output jack is accessible through an opening in a side wall of said housing.

10. The battery charging and maintenance system of claim 2, wherein said automobile regulator assembly further comprises an input jack, said input jack is positioned such that said input jack is accessible through an aperture in said housing.

11. The battery charging and maintenance system of claim 2, wherein said golf cart regulator assembly further comprises a second input jack, said second input jack is positioned such that said second input jack is accessible through and aperture in said housing.

12. The battery charging and maintenance system of claim 2, wherein said automobile charging lead assembly further comprises:

a first plug member and a second plug member, said first plug member and said second plug member preventing reverse biasing of the battery of the automobile when said automobile regulator assembly is electrically coupled to said first rectifier assembly using said automobile charging lead assembly.

13. The battery charging and maintenance system of claim 2, wherein said golf cart charging lead assembly further comprises:
a third plug member and a fourth plug member, said third plug member and said fourth plug member preventing reverse biasing of the batteries of the golf cart when said golf cart regulator assembly is electrically coupled to said second rectifier assembly using said golf cart charging lead assembly.

14. The battery charging and maintenance system of claim 2, further comprising:
a first and piece of a second portion of hook and loop fastener, said first and second pieces of a second portion of hook and loop fastener is adapted for coupling to a surface of the automobile and golf cart respectively.

15. A battery charging and maintenance system for the long term maintenance and charging needs of golf carts comprising:
a charging assembly adapted for converting alternating current into direct current for use in charging batteries;
a golf cart regulator assembly having a housing, said housing having a first portion of hook and loop fastener applied to a back face of said housing, said first portion of hook and loop fastener is used to couple said golf cart regulator to an interior surface of the golf cart, said golf cart regulator is electrically couplable to said charging assembly;
a golf cart charging lead assembly for electrically coupling said charging assembly to said golf cart regulator assembly;
an automobile regulator assembly having a housing, said housing having a first portion of hook and loop fastener applied to a back face of said housing, said first portion of hook and loop fastener is used to couple said automobile regulator to an interior surface of the automobile, said automobile regulator is electrically couplable to said charging assembly;
an automobile charging lead assembly for electrically coupling said charging assembly to said automobile regulator assembly;
said charging assembly further comprises:
a housing having four side walls a top wall and a bottom wall defining an interior space;
a transformer adapted for stepping down voltage from an outlet, said transformer preferably is adapted for working with 115 volts and 60 hertz, said transformer is positioned within said housing;
voltage control assembly for controlling the voltage output of the charging assembly, said voltage control assembly is positioned within said housing;
a first rectifier assembly for converting the stepped down ac voltage from said transformer to a dc voltage for use in charging the battery of an automobile, said first rectifier assembly is positioned within said housing;
a second rectifier assembly for converting the stepped down ac voltage from said transformer to a dc voltage for use in charging the batteries of a golf cart, said second rectifier assembly is positioned within said housing;
said first rectifier assembly further comprises:
a half wave rectifier for converting an ac voltage from said transformer to a dc voltage, said half wave rectifier is operationally coupled to said voltage control assembly;
a pulse generator assembly electrically connected to an output of said half wave rectifier, said pulse generator is used to pulse an output of said charging assembly;
an overload protection circuit electrically coupled in series with said pulse generator assembly, said overload protection circuit preventing an output exceeding a predetermined level;
a polarity sensing and limiting circuit electrically connected in series with said overload protection circuit, said polarity sensing and limiting circuit is adapted for preventing the reverse biasing of the battery when connected to said battery charging and maintenance system;
said pulse generating assembly further comprises:
a pulse generator for pulsing an output of said half wave rectifier;
a current control circuit connected in series with said pulse generator and providing a control feedback signal; and
a current flow indicator connected to the control feedback signal of said current control circuit and providing a current indicator signal to said pulse generator such that a control loop is defined by said pulse generator, current control circuit and current flow indicator;
said second rectifier assembly further comprises:
a full wave rectifier for converting an ac voltage from said transformer to a dc voltage, said full wave rectifier is operationally coupled to said voltage control assembly;
a second pulse generator assembly electrically connected to an output of said full wave rectifier, said second pulse generator is used to pulse an output of said charging assembly;
a second overload protection circuit electrically coupled in series with said second pulse generator assembly, said second overload protection circuit preventing an output exceeding a predetermined level;
a second polarity sensing and limiting circuit electrically connected in series with said second overload protection circuit, said second polarity sensing and limiting circuit is adapted for preventing the reverse biasing of the battery when connected to said battery charging and maintenance system;
said second pulse generating assembly further comprises:
a second pulse generator for pulsing an output of full half wave rectifier;
a second current control circuit connected in series with said second pulse generator and providing a control feedback signal; and
a second current flow indicator connected to the control feedback signal of said second current control circuit and providing a current indicator signal to said second pulse generator such that a control loop is defined by said second pulse generator, second current control circuit and second current flow indicator;
said automobile regulator assembly further comprises a regulator for maintaining the voltage output by said first rectifier assembly within a predetermined maximum value and a predetermined minimum value;
said golf cart regulator assembly further comprises a second regulator for maintaining the voltage output by said second rectifier assembly within a predetermined maximum value and a predetermined minimum value;

said charging unit further comprises:

a first output jack electrically coupled to said first rectifier assembly, said first output jack is positioned such that said first output jack is accessible through an opening in a side wall of said housing;

a second output jack electrically coupled to said second rectifier assembly, said second output jack is positioned such that said second output jack is accessible through an opening in a side wall of said housing;

wherein said automobile regulator assembly further comprises an input jack, said input jack is positioned such that said input jack is accessible through an aperture in said housing;

wherein said golf cart regulator assembly further comprises a second input jack, said second input jack is positioned such that said second input jack is accessible through and aperture in said housing;

wherein said automobile charging lead assembly further comprises a first plug member and a second plug member, said first plug member and said second plug member preventing reverse biasing of the battery of the automobile when said automobile regulator assembly is electrically coupled to said first rectifier assembly using said automobile charging lead assembly;

wherein said golf cart charging lead assembly further comprises:

a third plug member and a fourth plug member, said third plug member and said fourth plug member preventing reverse biasing of the batteries of the golf cart when said golf cart regulator assembly is electrically coupled to said second rectifier assembly using said golf cart charging lead assembly;

a first and piece of a second portion of hook and loop fastener, said first and second pieces of a second portion of hook and loop fastener is adapted for coupling to a surface of the automobile and golf cart respectively.

16. A battery charging and maintenance system for the long term maintenance and charging needs of golf carts comprising:

a charging assembly adapted for converting alternating current into direct current for use in charging batteries;

said charging assembly further comprises:

a housing having four side walls a top wall and a bottom wall defining an interior space;

a transformer adapted for stepping down voltage from an outlet, said transformer preferably is adapted for working with 115 volts and 60 hertz, said transformer is positioned within said housing;

a voltage control assembly for controlling the voltage output of the charging assembly, said voltage control assembly is positioned within said housing;

a first rectifier assembly for converting the stepped down ac voltage from said transformer to a dc voltage for use in charging the battery of an automobile, said first rectifier assembly is positioned within said housing;

a second rectifier assembly for converting the stepped down ac voltage from said transformer to a dc voltage for use in charging the batteries of a golf cart, said second rectifier assembly is positioned within said housing;

said first rectifier assembly further comprises:

a half wave rectifier for converting an ac voltage from said transformer to a dc voltage, said half wave rectifier is operationally coupled to said voltage control assembly;

a pulse generator assembly electrically connected to an output of said half wave rectifier, said pulse generator is used to pulse an output of said charging assembly;

an overload protection circuit electrically coupled in series with said pulse generator assembly, said overload protection circuit preventing an output exceeding a predetermined level;

a polarity sensing and limiting circuit electrically connected in series with said overload protection circuit, said polarity sensing and limiting circuit is adapted for preventing the reverse biasing of the battery when connected to said battery charging and maintenance system;

said pulse generating assembly further comprises:

a pulse generator for pulsing an output of said half wave rectifier;

a current control circuit connected in series with said pulse generator and providing a control feedback signal; and a current flow indicator connected to the control feedback signal of said current control circuit and providing a current indicator signal to said pulse generator such that a control loop is defined by said pulse generator, current control circuit and current flow indicator;

said second rectifier assembly further comprises:

a full wave rectifier for converting an ac voltage from said transformer to a dc voltage, said full wave rectifier is operationally coupled to said voltage control assembly;

a second pulse generator assembly electrically connected to an output of said full wave rectifier, said second pulse generator is used to pulse an output of said charging assembly;

a second overload protection circuit electrically coupled in series with said second pulse generator assembly, said second overload protection circuit preventing an output exceeding a predetermined level;

a second polarity sensing and limiting circuit electrically connected in series with said second overload protection circuit, said second polarity sensing and limiting circuit is adapted for preventing the reverse biasing of the battery when connected to said battery charging and maintenance system;

said second pulse generating assembly further comprises:

a second pulse generator for pulsing an output of full half wave rectifier;

a second current control circuit connected in series with said second pulse generator and providing a control feedback signal; and a second current flow indicator connected to the control feedback signal of said second current control circuit and providing a current indicator signal to said second pulse generator such that a control loop is defined by said second pulse generator, second current control circuit and second current flow indicator;

a first regulator for maintaining the voltage output by said first rectifier assembly within a predetermined maximum value and a predetermined minimum value;

a second regulator assembly for maintaining the voltage output by said second rectifier assembly within a predetermined maximum value and a predetermined minimum value;

said charging unit further comprises:

a switch member positioned such that said switch member is accessible from a side wall of said housing, said switch member being used to select between an output of said first regulator assembly and said second regulator assembly;

an output jack electrically coupled to said switch member, said output jack is positioned such that said output jack is accessible through an opening in a side wall of said housing;

a charging lead assembly comprising a first plug member and a second plug member, said first plug member and said second plug member preventing reverse biasing of the battery of the vehicle when said first or second regulator assembly is electrically coupled to said vehicle via said switch member using said charging lead assembly.

* * * * *